United States Patent [19]
Schreck et al.

[11] Patent Number: 5,716,698
[45] Date of Patent: Feb. 10, 1998

[54] PEELABLE, HEAT-SEALABLE, MULTILAYER POLYOLEFINIC FILM, PROCESS FOR THE PRODUCTION THEREOF, AND THE USE THEREOF

[75] Inventors: Michael Schreck, Frankfurt; Thomas Dries, Schwabenheim; Ursula Murschall, Nierstein; Dieter Scheidecker, Eltville; Adolf Wilhelm, Wiesbaden, all of Germany

[73] Assignee: Hoechst Aktiengesellschaft, Frankfurt, Germany

[21] Appl. No.: 500,617

[22] Filed: Jul. 11, 1995

[30] Foreign Application Priority Data

Jul. 13, 1994 [DE] Germany .......... 44 42 4604.8

[51] Int. Cl.$^6$ .......... B32B 5/16
[52] U.S. Cl. .......... 428/323; 428/328; 428/329; 428/331; 428/516; 428/523
[58] Field of Search .......... 428/323, 328, 428/329, 331, 517, 516, 523

[56] References Cited

U.S. PATENT DOCUMENTS

| 4,582,736 | 4/1986 | Duncan | 428/40 |
| 4,622,237 | 11/1986 | Lori | 427/40 |
| 4,666,778 | 5/1987 | Hwo | 428/412 |
| 5,277,970 | 1/1994 | Schuhmann et al. | 428/323 |
| 5,366,796 | 11/1994 | Murschall et al. | 428/216 |
| 5,498,474 | 3/1996 | Schuhmann et al. | 428/323 |

FOREIGN PATENT DOCUMENTS

| 0 044 515 | 1/1982 | European Pat. Off. . |
| 0 078 633 | 5/1983 | European Pat. Off. . |
| 0 083 495 | 7/1983 | European Pat. Off. . |
| 0 236 945 | 9/1987 | European Pat. Off. . |
| 0 367 613 | 5/1990 | European Pat. Off. . |
| 0 475 110 | 3/1992 | European Pat. Off. . |
| 86 12 789.6 | 6/1986 | Germany . |
| 38 01 535 | 7/1988 | Germany . |

*Primary Examiner*—H. Thi Le
*Attorney, Agent, or Firm*—Connolly and Hutz

[57] ABSTRACT

The invention relates to a peelable, oriented, opaque, multilayer polyolefin film comprising at least one opaque layer and a peelable top layer. All layers of the film are essentially vacuole-free. The opaque layer contains pigments having a mean particle diameter of from 0.01 to 1 μm.

20 Claims, No Drawings

PEELABLE, HEAT-SEALABLE, MULTILAYER POLYOLEFINIC FILM, PROCESS FOR THE PRODUCTION THEREOF, AND THE USE THEREOF

FIELD OF THE INVENTION

The present invention relates to a peelable, oriented, opaque, multilayer (or laminar or composite) polyolefin film comprising at least one opaque layer and a peelable top layer.

Other aspects of the invention relate to a process for the production of the peelable multilayer or laminar film and to the use of the film.

Description of the Prior Art

Polyolefin films are widely used as packaging films. The success of these materials is based on the good optical and mechanical properties and on the simple moldability of the films. In addition to welding, heat-sealing of films has increased in importance. Heat-sealable films preferably have a top layer of a polymer with a lower crystallite melting point than the polymer of the base layer of the film. For sealing, the film layers are laid one on top of the other and warmed only to from 10° to 20° C. below the crystallite melting point, i.e. the top layers are not completely melted. The adhesion achieved between the heat-sealing layers is significantly less than if the same material is welded, but is sufficient for many applications (Kunststoff-Handbuch [Plastics Handbook], Volume IV, Carl Hanser Verlag, Munich, 1969, pages 623 to 640).

The seal seams in many cases have greater mechanical strength than the films themselves, so that opening of a sealed film package results not only in the latter being torn and destroyed in the seal seam, but also in propagation of the tear into the film itself and then further, uncontrolled propogation of the tear. This type of opening of the seam is referred to as cohesive fracture. For this reason, heat-sealable raw materials are also replaced by peelable top layers applied to film surfaces. The peelable top layers offer firstly good heat-sealing properties, but at the same time also offer the possibility of opening the seal seam again in a controlled manner without destroying the sealed materials.

U.S. Pat. No. 4,666,778 describes transparent, peelable films having good seal seam strengths and low haze. The peelable top layer comprises a polymer mixture of ethylenic polymers or ethylenic copolymers containing small amounts of propylene polymers and butylene polymers. The high transparency of the films is favorable for some applications, but is not always desired.

Peelable raw materials are known from the prior art. For example, the product datasheet "Novolen VP 9201" describes an olefinic polymer which is suitable for the production of peelable, coextruded heat-sealable layers on polypropylene films. The heat-sealing/peel layers are glossy to silk-matt and are predominantly used on pigmented/opaque support layers.

The prior art also discloses nontransparent, i.e. opaque or translucent films, which, depending on the top layer applied, can be heat-sealable or non-heat-sealable.

Opaque films contain in at least one layer pigments or vacuole-inducing particles or a combination thereof, causing the films to have significantly reduced light transmission compared with transparent films. For the purposes of the present invention, "opaque film" means a nontransparent film whose light transparency, measured in accordance with ASTM D 1003-77, is at most 70%, preferably at most 50%.

Vacuole-inducing particles are particles which are incompatible with the polymer matrix and result in the formation of vacuole-like cavities when the films are stretched, the size, type and number of the vacuoles depending on the material and on the size of the solid particles and on the stretching conditions, such as stretch ratio and stretch temperature. The vacuoles reduce the density and give the films a characteristic mother-of-pearl-like, opaque appearance caused by light scattering at the vacuole/polymer matrix interfaces. In general, the mean particle diameter of the vacuole-inducing particles is from 0.02 to 10 µm.

EP-A-0 083 495 describes an opaque, biaxially oriented film having a satinized appearance and a surface gloss of greater than 100% and containing at least one spherical solid particle per vacuole. In addition, the film has on both surfaces of the core layer a pore-free, transparent, thermoplastic cladding layer which has a thickness which determines the appearance of the film. An example given of a material for the solid particles is nylon. The particles generally have a diameter of greater than 1 µm. In this film too, the opacity is determined principally by the amount of solid particles and the process parameters during biaxial orientation.

EP-A-0 475 110 describes biaxially oriented white films having a support layer based on polypropylene polymers and top layers on one or both sides. The support layer contains coated $TiO_2$ particles whose coating contains at least one inorganic oxide and at least one organic compound. The films are distinguished by good mechanical properties and a high, permanent degree of whiteness.

EP-A-0 538 747 describes biaxially oriented polypropylene films having a matt top layer. The top layer comprises propylene copolymers and/or terpolymers and an HDPE. The films are distinguished by low gloss and high haze, ensuring the matt appearance.

EP-A-0 367 613 describes an opaque film having a vacuole-containing layer and a top layer having a rough, inscribable surface. The top layer contains a first polymer having an MFI of $\leq 1$ g/10 min and a second polymer which is incompatible with the first.

Although considerable progress has been made in the development of composite or multilayer or laminar polyolefin film structures having at least one opaque layer and a peelable top or outermost layer, there is still a need for a film structure of this type which is distinguished by a combination of the following properties:
high opacity
a high degree of whiteness
good peel properties
good seal seam strength
good hot-tack properties
high light absorption in the UV region
low minimum heat-sealing temperature
good heat-sealability to propylene homopolymers.

It was therefore an objective of this invention to provide such a composite film structure with these properties.

SUMMARY OF THE INVENTION

The objectives of this invention have been achieved by a multilayer or laminar film of the generic type described above in which all layers of the film are essentially vacuole-free and the opaque layer contains at least one pigment (preferably inorganic) having a mean particle diameter of from 0.01 to 1 µm.

Because of the lack of vacuoles in the film structure, the apparent density of the overall film structure is substantially the same as the true density and is greater than 0.85 g/cm³, preferably greater than 0.90 g/cm³ (e.g. from 0.92 to 1.0 g/cm³).

Detailed Description

The opaque layer of the novel multilayer film essentially comprises a polyolefin, preferably a propylene polymer, and opacifying pigments. In general, the opaque layer comprises at least 50% by weight, preferably from 60 to 99% by weight, in particular from 70 to 98% by weight, of the polyolefin, in each case based on the weight of the opaque layer.

Preferred polyolefins are propylene polymers. The propylene polymer generally comprises from 90 to 100% by weight, preferably from 95 to 100% by weight, in particular from 98 to 100% by weight, of propylene and has a melting point of 120° C. or above, preferably from 150° to 170° C., and generally has a melt flow index of from 0.5 to 8 g/10 min, preferably from 2 to 5 g/10 min, at 230° C. and a force of 21.6 N (DIN 53 735). Isotactic propylene homopolymers having an atactic content of 15% by weight or less, copolymers of ethylene and propylene having an ethylene content of 10% by weight or less, copolymers of propylene and $C_4$–$C_8$-α-olefins having an α-olefin content of 10% by weight or less, terpolymers of propylene, ethylene and butylene having an ethylene content of 10% by weight or less and a butylene content of 15% by weight or less are preferred propylene polymers for the core layer, particular preference being given to isotactic propylene homopolymers. The percentages by weight given are based on the particular polymer.

Also suitable is a mixture of said propylene homopolymers and/or copolymers (including bipolymers and/or terpolymers) and/or other polyolefins, in particular comprising monomers having 2 to 6 carbon atoms (preferably where the double-bond of the 3 to 6-carbon monomers is in the α-position), where the mixture comprises at least 50% by weight, in particular at least 75% by weight, of propylene polymer. Other polyolefins which are suitable in the polymer mixture are polyethylenes, in particular HDPE, LDPE, VLDPE and LLDPE, where the proportion of these polymers does not exceed 15% by weight in each case, based on the polymer mixture.

According to the invention, the opaque layer of the film contains opacifying pigments in a maximum amount of 40% by weight, preferably from 1 to 30% by weight, in particular from 2 to 20% by weight, based on the weight of the opaque layer. It is absolutely necessary that the pigments initiate essentially no vacuoles, since the opaque layer must, in accordance with the invention, be vacuole-free.

This means that pigments for the purposes of the present invention are incompatible particles which result in essentially no vacuole formation during stretching of the film. The coloring action of the pigments is caused by the particles themselves. In order that the pigments generate no vacuoles, they must have a mean particle diameter in the range from 0.01 to a maximum of 1 μm. The term "pigments" covers both "white pigments", which give the films a white color, and "colored pigments", which give the film a colored or black color. In general, the mean particle diameter of the pigments is in the range from 0.01 to 1 μm, preferably from 0.01 to 0.7 μm, in particular from 0.01 to 0.4 μm.

Conventional pigments are materials such as, for example, aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, preference being given to white pigments such as calcium carbonate, silicon dioxide, titanium dioxide and barium sulfate.

The titanium dioxide particles generally comprise at least 95% by weight of rutile and are preferably employed with a coating of inorganic oxides, as is usually used as a coating for $TiO_2$ white pigment in papers or paints for improving the lightfastness. Particularly suitable inorganic oxides include the oxides of aluminum, silicon, zinc and magnesium or mixtures of two or more of these compounds. They are precipitated from water-soluble compounds, for example alkali metal aluminates, in particular sodium aluminates, aluminum hydroxide, aluminum sulfate, aluminum nitrate, sodium silicate or salicylic acid, in the aqueous suspension. Coated $TiO_2$ particles are described, for example, in EP-A-0 078 633 and EP-A-0 044 515.

The coating may also contain organic compounds containing polar and nonpolar groups. Preferred organic compounds are alkanols and fatty acids having 8 to 30 carbon atoms in the alkyl group, in particular fatty acids and the primary n-alkanols having 12 to 24 carbon atoms, and polydiorganosiloxanes and/or polyorganohydrosiloxanes, such as polydimethylsiloxane and polymethylhydrosiloxane.

The coating on the $TiO_2$ particles usually comprises from 1 to 12 g, in particular from 2 to 6 g, of inorganic oxides, and if desired additionally from 0.5 to 3 g, in particular from 0.7 to 1.5 g, of organic compounds, in each case based on 100 g of $TiO_2$ particles. It has proven particularly advantageous for the $TiO_2$ particles to be coated with $Al_2O_3$ or with $Al_2O_3$ and polydimethylsiloxane.

It is essential to the invention that neither the opaque layer nor another layer in the film has a vacuole-containing structure, i.e. the entire film must be essentially vacuole-free. It has been found that a vacuole-containing film with a peelable top layer is completely unsuitable as a peelable packaging material. The layer structure delaminates, and the controlled opening of the seal seams which is desired is impossible. Surprisingly, the desired opaque appearance and the requisite delamination resistance of a peelable opaque film are obtained if only opacifying pigments having a mean particle diameter of from 0.01 to 1 μm which generate no vacuoles are added to a layer of the film.

The novel multilayer film may contain (a) further interlayer(s) between the opaque layer and the top layer. This (these) interlayer(s) which may be present essentially comprise(s) propylene polymers or polypropylene mixtures, as described above for the opaque layer. In principle, the opaque layer and the interlayer(s) can comprise the same or different propylene polymers or mixtures. The melt flow indices of the polymers for the opaque layer and interlayer (s) should be as close as possible in magnitude. If necessary, the MFI of the interlayer(s) can be somewhat higher, with a maximum difference of 20%. If desired, additives in effective amounts in each case can be added to the interlayers, but no vacuole-inducing particles may be present.

In a further advantageous embodiment, the propylene polymers employed in the opaque layer and/or interlayer are partially degraded by the addition of organic peroxides. A measure of the degree of degradation of the polymer is the degradation factor A, which gives the relative change in melt flow index, measured in accordance with DIN 53 735, of the polypropylene, based on the starting polymer.

$$A = \frac{MFI_2}{MFI_1}$$

$MFI_1$=melt flow index of the propylene polymer before addition of the organic peroxide $MFI_2$=melt flow index of the peroxidically degraded propylene polymer.

According to the invention, the degradation factor A of the propylene polymer employed is in a range from 3 to 15, preferably from 6 to 10.

Particularly preferred organic peroxides are dialkyl peroxides, where the term alkyl radical is taken to mean a conventional saturated, straight-chain or branched lower alkyl radical having up to six carbon atoms. Particular preference is given to 2,5-dimethyl-2,5-di(t-butylperoxy)hexane and di-t-butyl peroxide.

In addition to the opaque layer, the novel film comprises at least one peelable top layer. For the purposes of the present invention, the top layer is an outer layer, so that the outer surface of the top layer forms one of the two film surfaces.

The peelable top layer of the novel multilayer film comprises a mixture or blend, described below in greater detail, of a plurality of incompatible polymers (preferably two components, referred to hereinafter as "components I and II") and, optionally, additives. For the purposes of the present invention, "incompatible" means that two components form two separate phases. In general, the top layer comprises at least 70% by weight, preferably from 75 to 100% by weight, in particular from 90 to 98% by weight, of said mixture. The above percent by weight data are based on the weight of the top layer.

Component I of the peelable top layer mixture or blend is essentially a propylene homopolymer or a copolymer (preferably an olefinic bipolymer, terpolymer, etc., of ethylene and an α-olefinic unit of 3 to 10 carbon atoms or two different α-olefinic units of 3 to 10 carbon atoms), e.g. a bipolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of said homopolymers, bipolymers and terpolymers or a blend of two or more of said homopolymers, bipolymers and terpolymers, optionally mixed with one or more of said homopolymers, bipolymers and terpolymers.

Component I particularly preferably essentially comprises a bipolymer of ethylene and propylene or ethylene and 1-butylene or propylene and 1-butylene or a terpolymer of ethylene and propylene and 1-butylene or a mixture of two or more of said particularly preferred homopolymers, bipolymers and terpolymers or a blend of two or more of said particularly preferred homopolymers, bipolymers and terpolymers, if desired mixed with one or more of said homopolymers, bipolymers and terpolymers, particular preference being given to propylene homopolymer or random ethylene-propylene copolymers having an ethylene content of from 2 to 10% by weight, preferably from 5 to 8% by weight, or random propylene-1-butylene copolymers having a butylene content of from 4 to 25% by weight, preferably from 10 to 20% by weight, in each case based on the total weight of the copolymer, or random ethylene-propylene-1-butylene terpolymers having an ethylene content of from 1 to 10% by weight, preferably from 2 to 6% by weight, and a 1-butylene content of from 3 to 20% by weight, preferably from 8 to 10% by weight, in each case based on the total weight of the terpolymer, or a blend of an ethylene-propylene-1-butylene terpolymer and a propylene-1-butylene copolymer having an ethylene content of from 0.1 to 7% by weight and a propylene content of from 50 to 90% by weight and a 1-butylene content of from 10 to 40% by weight, in each case based on the total weight of the polymer blend.

The propylene polymer composition employed as component I is or includes a propylene homopolymer and hence comprises predominantly (at least 90%) propylene and has a melting point of 140° C. or above, preferably from 150° to 170° C., isotactic homopolypropylene having an n-heptane-soluble content of 6% by weight or less, based on the isotactic homopolypropylene, being preferred. The homopolymer of component I or the homopolymer present therein generally has a melt flow index of from 0.5 g/10 min to 15 g/10 min, preferably from 1.5 g/10 min to 6 g/10 min, at 230° C. and a force of 21.6 N (DIN 53 735).

The above-described copolymers generally have a melt flow index of from 1.5 to 30 g/10 min, preferably from 3 to 15 g/10 min. The melting point is in the range from 120° to 140° C., and these properties are generally found in both the bipolymers and the terpolymers. The above-described blend of bipolymers and terpolymers has a melt flow index of from 5 to 9 g/10 min and a melting point of from 120° to 150° C. All the abovementioned melt flow indices are measured at 230° C. and a force of 21.6 N (DIN 53 735). Other layers of copolymers and/or terpolymers preferably form the top layers of heat-sealable embodiments of the film.

Component II of the peelable top layer mixture is a polymer which is incompatible with the above-described olefinic polymers and is built up predominantly from ethylene sequences. For the purposes of the present invention, "incompatible polymer" means that the incompatible polymer is in the form of a separate phase alongside the olefinic polymer. Preference is given to HDPE, MDPE, LDPE, LLDPE and VLDPE. In general, these ethylene polymers contain a small amount of <10% by weight, preferably from 1 to 8% by weight, of comonomer. Suitable comonomers are olefins having 3 to 10 carbon atoms, preferred comonomers being propene, 1-butene and/or 1-hexene.

The blend (the mixture of the incompatible polymers, e.g. a mixture of components I and II) shows a separate melting peak for each phase in a melting diagram recorded by DSC. In the preferred two-component mixture, the first melting peak is in the range from 105° to 135° C. and the second melting peak in the range from 120° to 140° C.

The ratio (weight ratio) between the two incompatible components I and II in the top layer mixture or blend can vary within broad limits, depending on the peel force desired. The component I:II ratio is preferably in the range from 5:95 to 95:5, preferably from 30:70 to 70:30, in particular 50:50.

The novel film has at least two layers and always comprises, as essential layers, the opaque layer and at least one peelable top layer, preferably top layers on both sides, which may be identical or different. The choice of the number of layers depends primarily on the proposed application, particular preference being given to three-, four- and five-layered embodiments. Particular preference is given to a four-layer structure, in which the opaque layer forms the base layer of the film. The peelable top or outermost layer is applied to one surface of the base layer, and a homopolymer interlayer is applied to the other surface of the base layer and is covered by a second top or outermost layer comprising a copolymer.

The overall thickness of the complete laminar film structure can vary within broad limits and depends on the intended use. The preferred embodiments of the novel laminar film have overall thicknesses of from 5 to 200 µm, preferably from 10 to 100 µm, particularly preferably from 20 to 80 µm.

The thickness of any interlayer(s) present is, in each case independently of one another, from 2 to 12 µm, preferably from 3 to 8 µm, in particular from 3 to 6 µm. The values mentioned are each based on one interlayer.

The thickness of the peelable top layer(s) is selected independently of other layers and is preferably in the range from 0.5 to 10 µm, in particular from 0.6 to 5 µm, particularly preferably from 0.8 to 3 µm. The top layers, which are generally the outermost layers and hence are applied to both sides of a base film or a laminate comprising a base film and any interlayers, are alternatively either identical or different regarding thickness and composition.

Any other top layer present has a thickness of from 0.1 to 5 µm, preferably from 0.2 to 1 µm, in particular from 0.3 to 0.5 µm.

For the purposes of the present invention, the base layer is the layer making up more than 50% of the total thickness of the film. Its thickness is the difference between the total thickness and the thickness of the top layers and interlayer(s) applied and can therefore vary within broad limits analogously to the total thickness. As indicated above, top layers generally form the outermost layer of the film.

In order further to improve certain properties of the novel propylene polymer film structure, both the base layer and the interlayer(s) and the top layer(s) can contain additives in an effective amount in each case, preferably hydrocarbon resin and/or antistatics and/or antiblocking agents and/or lubricants and/or stabilizers and/or neutralizers, which are compatible with the polymers of the core layer and of the top layer(s), with the exception of the antiblocking agents, which are generally incompatible. All amounts given below in weight percent (% by weight) are in each case based on the layer or layers to which the additive can be added.

A low-molecular-weight resin such as a hydrocarbon resin is preferably added to the base layer and/or interlayer(s). Hydrocarbon resins are low-molecular-weight polymers whose molecular weight is generally in a range of from 300 to 8000, preferably from 400 to 5000, especially from 500 to 2000. The molecular weight of the resins is thus significantly lower than that of the propylene polymers which form the principal component of the individual film layers and generally have a molecular weight of greater than 100,000.

The proportion of the low-molecular-weight resin is in the range from 1 to 30% by weight, preferably from 2 to 10% by weight. The softening point of the resin is between 100° and 180° C. (measured in accordance with DIN 1995-U4, corresponding to ASTM E-28), preferably from about 120° to 160° C. Of the numerous low-molecular weight resins, hydrocarbon resins are preferred, particularly in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555).

The petroleum resins are those hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular weight homopolymers of styrene or copolymers of styrene with other monomers such as methylstyrene, vinyltoluene and butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at high temperature for a long time. Depending on the reaction temperature, dimers, trimers or oligomers can be obtained.

The terpene resins are polymers of terpenes, i.e. hydrocarbons of the formula $C_{10}H_{16}$, which are present in virtually all essential oils or oil-containing resins from plants, and phenol-modified terpene resins. Specific examples of terpenes which may be mentioned are pinene, α-pinene, dipentene, limonene, myrcene, camphene and similar terpenes. The hydrocarbon resins can also be so-called modified hydrocarbon resins. The modification is generally carried out by reaction of the raw materials before the polymerization, by the introduction of specific monomers or by reaction of the polymerized product, in particular by hydrogenation or partial hydrogenation.

Suitable hydrocarbon resins also include styrene homopolymers, styrene copolymers, cyclopentadiene homopolymers, cyclopentadiene copolymers and/or terpene polymers having a softening point of in each case above 135° C. (in the case of unsaturated polymers, the hydrogenated product is preferred). Very particular preference is given in the interlayers to cyclopentadiene polymers having a softening point of 140° C. or above.

Preferred antistatics are alkali metal alkanesulfonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having 10 to 20 carbon atoms which are substituted by ω-hydroxy-($C_1$–$C_4$)alkyl groups, N,N-bis(2-hydroxyethyl)alkylamines having 10 to 20 carbon atoms, preferably 12 to 18 carbon atoms, in the alkyl radical being particularly suitable. The effective amount of antistatic is generally in the range from 0.05 to 0.7% by weight. It is particularly preferred for the present invention to add tertiary aliphatic amines in an amount of from 0.4 to 0.6% by weight to the top layer(s). ®Armostat 600 is a particularly preferred antistatic.

The preferred lubricants are higher aliphatic acid amides, higher aliphatic acid esters, waxes and metal soaps and polydimethylsiloxanes. The effective amount of lubricant is in the range from 0.1 to 3% by weight. Particularly suitable is the addition of higher aliphatic acid amides in the range from 0.15 to 0.25% by weight in the base layer and/or the top layers. A particularly suitable aliphatic acid amide is erucamide. The addition of polydimethylsiloxanes is preferred in the range from 0.3 to 2.0% by weight, in particular polydimethylsiloxanes having a viscosity of from 10,000 to 1,000,000 $mm^2/s$.

Suitable stabilizers include conventional compounds which have a stabilizing action for polymers of ethylene, propylene and other $\alpha$-olefins. Their added amount is between 0.05 and 2% by weight. Particularly suitable are phenolic stabilizers, alkali metal or alkaline earth metal stearates and/or alkali metal or alkaline earth metal carbonates. Phenolic stabilizers are preferred in an amount of from 0.1 to 0.6% by weight, in particular from 0.15 to 0.3% by weight, and having a molecular weight of greater than 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

The antiblocking agents are preferably added to the top or outermost layer(s), and their essential purpose is to modify the surface properties of the laminar film structure, not necessarily any of the overall properties (opacity, whiteness, peelability, etc.). For this reason, and because these agents are added to the top layer or layers rather the opaque layer (and do not function as pigments), antiblocking agents can have (and preferably do have) a mean particle diameter larger than 1 μm. Suitable antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like. Preference is given to benzoguanamine-formaldehyde polymers, silicon dioxide and calcium carbonate. The effective amount of antiblocking agent is in the range from 0.1 to 7% by weight, preferably from 0.5 to 5% by weight. A suitable mean particle size is between 1 and 6 μm, in particular 2 and 5 μm, particles having a spherical shape, as described in EP-A-0 236 945 and DE-A-38 01 535, being particularly suitable.

Neutralizers are preferably calcium stearate and/or calcium carbonate having a mean particle size of at most 0.7 μm, an absolute particle size of less than 10 μm and a specific surface area of at least 40 $m^2/g$, and/or dihydrotalcite.

The invention furthermore relates to a process for the production of the multilayer film according to the invention by coextrusion. The technique of coextrusion is known per se and need not be described in detail. According to the invention, the coextrudate is subjected to certain stretching steps, preferably carried out in certain ratios and temperature ranges.

Thus, the process is carried out by coextruding the melts corresponding to the individual layers of the film through a flat-film die, taking off the resultant coextrudate film over one or more rolls for solidification. Generally, the thus-solidified laminar film is subsequently subjected to orientation, e.g. biaxial stretching (orientation), followed by heat-setting of the biaxially stretched film and, optionally, flame-treating the surface layer intended for corona treatment.

Biaxial stretching (orientation) is preferred and can be carried out simultaneously or consecutively, consecutive biaxial stretching, in which stretching is carried out first longitudinally (in the machine direction) and then transversely (perpendicular to the machine direction), being particularly favorable.

First, as is customary in coextrusion, the polymer or polymer mixture of the individual layers is compressed and liquefied in an extruder, it being possible for any additives added to be already present in the polymer. The melts are then pressed simultaneously through a flat-film die (slot die), and the extruded multilayer film is drawn off over one or more take-off rolls, where it cools and solidifies.

The resultant film is preferably then stretched longitudinally and transversely to the extrusion direction, which results in alignment of the molecule chains. The stretching is preferably from 4:1 to 7:1 in the longitudinal direction and from 6:1 to 11:1 in the transverse direction. The longitudinal stretching is expediently carried out with the aid of two rolls running at different speeds corresponding to the desired stretching ratio, and the transverse stretching is expediently carried out with the aid of an appropriate tenter frame.

Biaxial stretching of the film is followed by heat-setting (heat treatment), the film being kept at a temperature of from 110° to 150° C. for about 0.5 to 10 seconds. The film is subsequently wound up in the conventional manner by means of a wind-up unit.

It has proven particularly favorable to keep the take-off roll or rolls, by means of which the extruded film is also cooled and solidified, at a temperature of from 10° to 90° C., preferably from 20° to 60° C.

In addition, the longitudinal stretching is advantageously carried out at a temperature below 140° C., preferably in the range from 125° to 135° C., and the transverse stretching at a temperature above 140° C., preferably from 145° to 160° C.

If desired, one or both surfaces of the film can, as mentioned above, be corona- or flame-treated by one of the known methods after the biaxial stretching. For flame treatment with a polarized flame (cf. U.S. Pat. No. 4,622,237), a direct electric voltage is applied between a burner (negative pole) and a chill roll. The level of the applied voltage is between 500 and 3000 V, preferably in the range from 1500 to 2000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer here is substantially less than in the case of standard flame treatment, and films can be obtained in which the heat-sealing properties of the treated side are even better than those of the untreated side.

For the alternative corona treatment, the film is passed between two conductor elements serving as electrodes, such a high voltage, usually alternating voltage (about 10,000 V and 10,000 Hz), being applied between the electrodes that spray or corona discharges can occur. The spray or corona discharge ionizes the air above the film surface and reacts with the molecules of the film surface, causing formation of polar inclusions in the essentially nonpolar polymer matrix. The treatment intensities are within the usual range, preferably from 38 to 45 mN/m.

The process for producing a laminar film of this invention, for the reasons stated previously, results in a peelable, oriented, opaque, multilayer or laminar film comprising at least one opaque layer and a peelable top layer, wherein all layers of the film are essentially vacuole-free, and the multilayer or laminar film has the properties described above. For example, packages made from laminar films of this invention can be peeled open in a controlled manner.

Thus, a multilayer or laminar film of this invention is distinguished by good seal seam strength and good hot-tack properties. At the same time, the film has excellent peelabilty. Surprisingly, no delamination of individual film layers or tearing of the film occurs. However, it has been found that this delamination resistance is only present if all layers of the films, in particular the opaque layer, are essentially vacuole-free, and as a result the apparent and actual density of the multilaminar or laminar film are much the same and are greater than 0.85 g/cm$^3$, preferably greater than 0.90 g/cm$^3$, particularly preferably from 0.92 to 1.0 g/cm$^3$.

Furthermore, the film has low light transparency in the region of UV radiation of from 200 to 380 nm. This transparency is less than 5%, preferably less than 2%, and is essential for the packaging of light-sensitive foods, for example dairy products.

Also important is a low minimum heat-sealing temperature, which enables heat-sensitive foods to be packaged under mild conditions. The peeling raw material should therefore heat-seal to itself at a temperature below 130° C., preferably below 115° C.

It has been found that the peelable top layer heat-sealed not only to itself and to conventional heat-sealable top layers of propylene copolymers and/or terpolymers, but surprisingly the film also heat-seals very well to surfaces of propylene homopolymers, which cannot themselves be heat-sealed either to themselves nor to conventional heat-sealing layers. This makes it possible to use the multilayer or laminar film of this invention as a lid for containers made from propylene homopolymer and thus to extend the use of single-material packaging made from polypropylene to containers with lids, such as yoghurt pots, etc.

The principle and practice of the invention is now illustrated by the following non-limiting examples.

EXAMPLE 1

A four-layer film having the layer structure ABCD, i.e. the base layer B was surrounded by the top layer A and the interlayer C, was extruded as the sum by the coextrusion process from a flat-film die at an extrusion temperature of 260° C. The top layer D was extruded onto the interlayer C. The top layer D was corona treated.

The essential components of the base layer B were:

92.85% by weight of propylene homopolymer (PP) having an n-heptane-soluble content of 4.5% by weight (based on 100% of PP) and a melting point of 165° C.; the melt flow index of the propylene homopolymer was 3.2 g/10 min at 230° C. and a load of 21.6 N (DIN 53 735);

7.15% by weight of TiO$_2$ via Masterbatch ®P 8555 LM, supplier Schulman GmbH, Hüttenstraβe 211, D-54578 Kerpen, Germany.

The interlayer C comprised

100% by weight of propylene homopolymer (PP) having an n-heptane-soluble content of 4.5% by weight (based on 100% of PP) and a melting point of 165° C.; the melt flow index of the propylene homopolymer was 3.2 g/10 min at 230° C. and a load of 21.6 N (DIN 53 735).

The top layer on side A comprised a mixture of two components, namely a copolymer comprising ethylene and propylene units, having an ethylene content of 5.1% by weight, based on the copolymer, and a melting point of 129° C., and a PE having a melting point of 112° C., measured by DSC. The proportion of PE in the composition of the top layer was 45% by weight. This mixture can be obtained from BASF as ®Novolen VP 9201 blend.

The top layer on side D comprised a random ethylene-propylene copolymer having an ethylene content of 5% by weight, based on the weight of the copolymer. The melting point of the copolymer was 134° C., and the melt flow index was 7.0 g/10 min. 0.5% by weight of an N,N-bis(2-hydroxyethyl)alkylamine (®Armostat 600) as antistatic and 5% by weight of CaCO$_3$, Millicarb, from Omya GmbH, Cologne, Germany, were added to the top layer.

All layers contained 0.12% by weight of pentaerythrityl tetrakis[4-(3,5-di-tert-butyl-4-hydroxyphenyl)propionate] (®Irganox 1010) as stabilizer and 0.06% by weight of calcium stearate as neutralizer. The base layer furthermore contained 0.15% by weight of N,N-bis(2-hydroxyethyl)-(C$_{10}$–C$_{20}$)alkylamine (®Armostat 300) as antistatic.

After coextrusion, the extruded four-layer film was taken off over the corresponding process steps via a first take-off roll and a further trio of rolls and was cooled, subsequently stretched longitudinally, stretched transversely, set and corona treated, the following conditions, in detail, being selected:

Extrusion: extrusion temperature 260° C.

Longitudinal stretching: stretching roll T=135° C. longitudinal stretching by a factor of 6

Transverse stretching: heat-up zones T=180° C. stretching zones T=177° C. transverse stretching by a factor of 8

Setting: temperature T=155° C.

Corona treatment: voltage: 10,000 V frequency: 10,000 Hz

The multilayer film produced in this way had a surface tension of from 40 to 41 mN/m (side D) directly after production. The film was about 26 μm thick, the thickness of side A being about 2.1 μm, that of side D being about 0.5 μm, that of interlayer C being about 8 μm and that of the base layer B being 15.4 μm.

EXAMPLE 2

Example 1 was repeated, but the thickness of layer A was reduced to 1.3 μm and the thickness of the film was about 25.2 μm.

Comparative Example

A four-layer film having the layer structure ABCD, i.e. the base layer B was surrounded by the top layer A and the interlayer C, was extruded as the sum by the coextrusion process from a flat-film die at an extrusion temperature of 260° C. The top layer D was corona treated.

The essential components of the base layer were:

92.6% by weight of propylene homopolymer (PP) having an n-heptane-soluble content of 4.5% by weight (based on 100% of PP) and a melting point of 165° C.; the melt flow index of the propylene homopolymer was 3.2 g/10 min at 230° C. and a load of 21.6 N (DIN 53 735);

4.2% by weight of CaCO$_3$, ®Omyalithe 90T, supplier for Masterbatches Multibase, Z. I. du Giers, F-38380 Saint-Laurent-du-Pont, France;

3.2% by weight of TiO$_2$ via Masterbatch ®P 8555 LM, supplier Schulman GmbH, Hüttenstraβe 211, D-54578 Kerpen, Germany.

The interlayer C comprised

100% by weight of propylene homopolymer (PP) having an n-heptane-soluble content of 4.5% by weight (based on 100% of PP) and a melting point of 165° C.; the melt flow index of the propylene homopolymer was 3.2 g/10 min at 230° C. and a load of 21.6 N (DIN 53 735).

The top layer on side A comprised a mixture of two components, namely a copolymer comprising ethylene and propylene units, having an ethylene content of 5.1% by weight, based on the copolymer, and a melting point of 129° C., and a PE having a melting point of 112° C., measured by DSC. The proportion of PE in the composition of the top layer was 45% by weight. This mixture can be obtained from BASF as ®Novolen VP 9201 blend.

The top layer on side D comprised a random ethylene-propylene copolymer having an ethylene content of 5% by weight, based on the weight of the copolymer. The melting point of the copolymer was 134° C., and the melt flow index was 7.0 g/10 min. 0.5% by weight of an N,N-bis(2-hydroxyethyl)alkylamine (®Armostat 600) as antistatic and 5% by weight of CaCO$_3$, Millicarb, from Omya GmbH, Cologne, Germany, were added to the top layer.

All layers contained 0.12% by weight of pentaerythrityl tetrakis[4-(3,5-di-tert-butyl-4-hydroxyphenyl)propionate] (®Irganox 1010) as stabilizer and 0.06% by weight of calcium stearate as neutralizer. The base layer furthermore contained 0.15% by weight of N,N-bis(2-hydroxyethyl)-(C$_{10}$–C$_{20}$)alkylamine (®Armostat 300) as antistatic.

After coextrusion, the extruded four-layer film was taken off over the corresponding process steps via a first take-off roll and a further trio of rolls and was cooled, subsequently stretched longitudinally, stretched transversely, set and corona treated, the following conditions, in detail, being selected:

Extrusion: extrusion temperature 260° C.
Longitudinal stretching: stretching roll T=135° C. longitudinal stretching by a factor of 6
Transverse stretching: heat-up zones T=180° C. stretching zones T=177° C. transverse stretching by a factor of 8
Setting: temperature T=155° C.
Corona treatment: voltage: 10,000 V frequency: 10,000 Hz The multilayer film produced in this way had a surface tension of from 40 to 41 mN/m (side D) directly after production. The film was about 26 µm thick, the thickness of side A being about 2.1 µm, that of side D being about 0.5 µm, that of interlayer C being about 8 µm and that of the base layer B being 15.4 µm.

Applicational Testing

Heat-sealing to PP pots

The sealing was carried out using a Gasti unit under the following conditions:
Sealing time: 1 s
Temperature: 150° C.
Pressure: 6 bar The peelability was assessed by tensioning the peel seams, and the seam strength was determined by pressure loading—exerting pressure on the lid.

In order to determine the barrier properties—specifically to liquids—water-filled PP pots were produced and shaken or stored on the lid.

The following measurement methods were used in order to characterize the raw materials and the films:

Mean Molecular Weight and Molecular Weight Dispersity

The mean molecular weights ($M_w$, $M_n$) and mean molecular weight dispersity ($M_w/M_n$) were determined in accordance with DIN 55 672, Part 1, by gel permeation chromatography. Instead of THF, the eluent used was orthodichlorobenzene. Since the olefinic polymers to be investigated are insoluble at room temperature, the entire measurement was carried out at elevated temperature ($\approx$135° C.).

Viscosity Number

The viscosity number is determined in accordance with DIN 53 728, Part 4.

Melt Flow Index

The melt flow index was measured in accordance with DIN 53 735 at a load of 21.6 N and at 230° C.

Melting Point

DSC measurement, maximum of the melting curve, heating rate 20 K/min.

Gloss

The gloss was determined in accordance with DIN 67 530. The reflector value was measured as an optical parameter for the surface of a film. In accordance with ASTM-D 523-78 and ISO 2813 standards, the angle of incidence was set at 20° or 60°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

Seal Seam Strength and Peel Strength

For the measurement, two film strips 15 mm in width were laid one on top of the other and sealed for 0.5 s at 130° C. and a sealing pressure of 10 N/mm$^2$ (Brugger NDS unit, sealing jaws heated on one side). The seal seam strength was determined by the T-peel method.

In order to determine the strength of the seal seam to homopolymers, the peel layer was sealed in a width of 15 mm to a non-corona-treated film with a thickness of 25 µm having homopolymeric top layers, where a temperature of 150° C., a pressure of 6 bar and a sealing time of 1 second were selected. The peel strength was determined by the T-peel method.

Density

The density was determined in accordance with DIN 53 479, Method A.

Hot-tack

"Hot-tack" denotes the strength of a still-hot seal seam immediately after the sealing tools are opened. For the measurement, two pieces of film measuring 5·30 mm are laid one on top of the other and fixed at the ends with a clamping weight G of 100 g. A flat spatula is inserted between the film layers, and the measurement strip is fed between the sealing jaws via two deflection rolls. The sealing is then initiated, the spatula being withdrawn from between the layers as soon as the sealing jaws have closed. The sealing conditions set are 150° C. for the sealing temperature, 0.5 s for the sealing time and 30 N/cm$^2$ for the pressure. At the end of the sealing time of 0.5 s, the sealing jaws (area 20 cm$^2$) open automatically, and the sealed measurement strip is jerked forward by the loading weight as far as the deflection roll and at the same time peeled apart at a peel angle of 180°. The hot-tack is the depth of delamination of the sealed seam in mm experienced during the above action of force.

Surface Tension

The surface tension was determined by the ink method (DIN 53 364).

Printing Ink Adhesion/Metal Adhesion

The corona-treated films were printed or metallized 14 days after production (short-term assessment) or 6 months after production (long-term assessment). The ink or metal adhesion was assessed by means of an adhesive tape test. If no ink or metal could be removed by means of an adhesive tape, the adhesion was assessed as very good and if a significant amount of ink or metal was removed, the adhesion was assessed as poor.

Determination of the Minimum Sealing Temperature

Heat-sealed samples (seal seam 20 mm×100 mm) are produced using a Brugger HSG/ET sealing unit by sealing a film at different temperatures with the aid of two heated sealing jaws at a sealing pressure of 10 N/cm² and a sealing time of 0.5 s. Test strips 15 mm in width are cut out of the sealed samples. The T-seal seam strength, i.e. the force necessary to separate the test strips, is determined using a tensile testing machine at a take-off rate of 200 mm/min, the seal seam plane forming a right angle with the tension direction. The minimum sealing temperature is the temperature at which a seal seam strength of at least 0.5 N/15 mm is achieved.

Ethylene Content

The ethylene content of the peel raw material was determined by IR spectroscopy, with the absorbance per mm being measured at 732 cm$^{-1}$ on pressed films approximately 350 µm in thickness. The assignment of the absorbance per mm to ethylene contents was carried out with the aid of a calibration curve based on $^{13}$C-NMR data.

Opacity and Whiteness

The opacity and whiteness were determined with the aid of an "ELREPHO" electric remission photometer from Zeiss, Oberkochem (DE), standard illuminant C, 2° standard observer. The opacity was determined in accordance with DIN 53 146. The whiteness is defined as W=RY+3RZ−3RX, where W=whiteness, RY, RZ and RX=corresponding reflection factors when the Y, Z and X color measurement filters respectively are used. The white standard used was a barium sulfate compact (DIN 5033, Part 9). A detailed description is given, for example, in Hansl Loos, "Farbmessung" [Color Measurement], Verlag Beruf und Schule, Itzehoe (1989).

Light Transparency

The light transparency was measured in accordance with ASTM-D 1003-77.

The table below shows the properties of the multilayer films of the examples.

TABLE (film properties)

|  | Example 1 | Example 2 | Comparative Example |
| --- | --- | --- | --- |
| Thickness [µm] | 26 | 25.2 | 26 |
| Density [g/cm³] | 0.95 | 0.95 | 0.78 |
| Opacity | 58 | 57 | 65 |
| Sealing A/A | 4.2 | 2.9 | 1.9[1] |
| Sealing D/D | 3.4 | 3.4 | 3.2 |
| Stackability | + | + | + |
| Seal strength to PP | 1.8 | 1.2 | 1.1[1] |
| Leak resistance of the pots | + | + | − |
| Peelability | + | + | −[1] |

[1]Delamination and tearing of the film

What is claimed is:

1. A peelable, oriented, opaque, laminar polyolefin film comprising at least one opaque layer and a peelable top layer, wherein all layers of the film are essentially vacuole-free and the opaque layer contains inorganic pigment having a mean particle diameter of from 0.01 to 1 µm.

2. A laminar film as claimed in claim 1, wherein the opaque layer of the film comprises polyolefin in an amount of at least 50% by weight, based on the weight of the opaque layer.

3. A laminar film as claimed in claim 2, wherein said polyolefin is a propylene polymer, and said amount is at least 75 to 100% by weight.

4. A laminar film as claimed in claim 1, wherein the opaque layer of the laminar film contains an effective amount of at least one opacifying pigment, said effective amount not exceeding about 40% by weight.

5. A laminar film as claimed in claim 4, wherein said effective amount is about 1 to about 30% by weight.

6. A laminar film as claimed claim 1, wherein the pigment has a mean particle diameter of from 0.01 to 0.7 µm.

7. A laminar film as claimed in claim 1, wherein said mean particle diameter ranges from 0.01 to 0.4 µm, and wherein said laminar film has an apparent density of at least 0.85 g/cm³.

8. A laminar film as claimed in claim 1, wherein a said pigment is an inorganic oxide, carbonate, sulfate, or mixture thereof.

9. A laminar film as claimed in claim 8, wherein said oxide is TiO$_2$ or SiO$_2$, said carbonate is CaCO$_3$, and said sulfate is BaSO$_4$.

10. A laminar film as claimed in claim 1, wherein the peelable top layer comprises a first polymer and a second polymer which is essentially incompatible with the first polymer.

11. A laminar film as claimed in claim 10, wherein said first polymer comprises a propylene homopolymer or an olefinic copolymer, said olefinic copolymer comprising C$_2$ to C$_{10}$ units, any C$_5$–C$_{10}$ units of which being α-olefin units or a blend of at least one said homopolymer and at least one said copolymer.

12. A laminar film as claimed in claim 11, wherein said first polymer comprises a blend of homopolymers or an olefinic bipolymer or terpolymer or a mixture thereof, or a blend of at least one homopolymer with a said mixture of bipolymer and terpolymer, or a blend of said mixtures with each other or with at least one said homopolymer, said bipolymer being a bipolymer of ethylene and propylene or ethylene and butylene or propylene and butylene or ethylene and an α-olefin having 5 to 10 carbon atoms or propylene and another α-olefin having 5 to 10 carbon atoms or said terpolymer being a terpolymer of ethylene and propylene and butylene or ethylene and propylene and another α-olefin having 5 to 10 carbon atoms.

13. A laminar film as claimed in claim 11, wherein said second, incompatible polymer is an high-density polyethylene (HDPE), medium-density polyethylene (MDPE), low-density polyethylene (LLDPE), linear low-density polyethylene (LLDPE) or very low-density polyethylene (VLDPE).

14. A laminar film as claimed in claim 11, wherein the peelable top layer comprises a mixture of essentially two incompatible polymers, said first polymer and said second polymer, and wherein the peelable top layer has essentially two separate melting peaks, the first melting peak being in the range from 105° to 135° C. and the second melting peak being in the range from 120° to 140° C.

15. A laminar film as claimed in claim 1, wherein the opaque layer is the base layer of the film.

16. A laminar film as claimed in claim 1, wherein the film comprises a multilayer film which comprises four layers, the peelable top layer being applied to one surface of the opaque layer and one surface of an interlayer comprising propylene homopolymer being applied to the other surface of the opaque layer, and a second peelable top layer or a second top layer consisting essentially of a propylene copolymer or propylene terpolymer or mixture thereof, being applied to the other surface of the interlayer.

17. A laminar, multilayer film as claimed in claim 16, wherein the multilayer film comprises five layers, the opaque layer being the base layer, layers consisting essentially of a propylene homopolymer being applied to both surfaces of the base layer, and a top layer being applied to each interlayer, at least one of the two top layers being peelable.

18. A laminar, multilayer film as claimed in claim 16, wherein the peelable top layer has a thickness of from 0.5 to 5 µm and the second peelable top layer or second top layer has a thickness of from 0.1 to 0.5 µm.

19. A laminar film as claimed in claim 1, wherein the top layer contains an antiblocking agent and an antistatic agent, said antiblocking agent comprising $CaCO_3$ having a mean particle diameter of from 2 to 5 µm in an amount of from 0.5 to 5% by weight, and said antistatic agent comprising a tertiary aliphatic amine in an amount of from 0.4 to 0.6% by weight, the percent by weight data being based on the weight of the top layer.

20. A heat-sealed package comprising a laminar film as claimed in claim 1, said package being capable of being peeled open without tearing said laminar film.

* * * * *